United States Patent
Hausen et al.

(10) Patent No.: US 6,343,235 B1
(45) Date of Patent: Jan. 29, 2002

(54) PID CONTROLLER WITH PROTECTION OF THE INTEGRATOR AGAINST SATURATION UPON A RAPID CHANGE OF THE REFERENCE VARIABLE

(75) Inventors: Detlef Hausen, Aschaffenburg; Gerold Liebler, Marktheidenfeld; Dieter Sachs, Partenstein, all of (DE)

(73) Assignee: Mannesmann Rexroth AG, Lohr/Main (DE)

( * ) Notice: Subject to any disclaimer, the term of this patent is extended or adjusted under 35 U.S.C. 154(b) by 0 days.

(21) Appl. No.: 09/230,184
(22) PCT Filed: Jul. 4, 1997
(86) PCT No.: PCT/EP97/03532
§ 371 Date: Jan. 14, 1999
§ 102(e) Date: Jan. 14, 1999
(87) PCT Pub. No.: WO98/04963
PCT Pub. Date: Feb. 5, 1998

(30) Foreign Application Priority Data

Jul. 24, 1996 (DE) .......................... 196 29 845

(51) Int. Cl.⁷ ............................................. G05B 13/02
(52) U.S. Cl. ............................................ 700/42; 700/54
(58) Field of Search ............................. 700/41–43, 54; 318/609–610

(56) References Cited

U.S. PATENT DOCUMENTS

| | | | |
|---|---|---|---|
| 4,755,924 A | | 7/1988 | Hiroi ............................ 700/54 |
| 4,872,104 A | * | 10/1989 | Holsinger .................... 364/166 |
| 4,908,747 A | * | 3/1990 | Lane ............................ 364/162 |
| 5,072,357 A | | 12/1991 | Niessen et al. ............... 700/41 |
| 5,202,821 A | | 4/1993 | Bauck et al. ................. 700/42 |
| 5,384,526 A | | 1/1995 | Bennett ....................... 318/610 |
| 5,404,289 A | | 4/1995 | Hang et al. .................. 700/55 |
| 5,481,453 A | * | 1/1996 | Desantis ..................... 364/162 |

FOREIGN PATENT DOCUMENTS

| | | |
|---|---|---|
| DE | 3418969 | 11/1985 |
| DE | 3610962 | 7/1987 |
| DE | 4038212 | 8/1991 |
| EP | 0057573 | 8/1982 |
| EP | 0057574 | 8/1982 |
| EP | 0602645 | 6/1994 |
| GB | 2176029 | 12/1986 |
| WO | 9607128 | 3/1996 |

OTHER PUBLICATIONS

Patent Abstracts of Japan, 62–26502 A. P–591, Jul. 2, 1987, vol. 11, No. 203, Nippon Kokan K.K.

Patent Abstracts of Japan, 1–94412 A., P–904, Jul. 25, 1989, vol. 13, No. 329, Sawafuji Electric Co. Ltd.

Heinz Unbehauen "Classical methods for analysis and synthesis of linear continuous control systems" pp. 141–142, Fig. 5.3.1., Verlag Vieweg 1982.

Mannesmann Rexroth GmbH, "The Hydraulic Trainer" vol. 6, p. 29, Diagram 6, "Hydrostatic drives with secondary control" RD 00 293/08.89.

* cited by examiner

*Primary Examiner*—William Grant
*Assistant Examiner*—Elliot Frank
(74) *Attorney, Agent, or Firm*—Martin A. Farber

(57) ABSTRACT

A PID controller has a parallel arrangement of a P-element, an I-element, and a D-element coupled to a first summation point for adding their respective output signals, a summation signal produced by the first summation point being employed for control of a variable. An actual value of the controlled variable is inputted to the parallel arrangement of the P-element, the I-element, and the D-element. The I-element is a series arrangement of a weighting section followed by an integrator, the I-element being coupled to the weighting section by a second summation point. The controller applies a time derivative of the actual value of the controlled variable to the second summation point, the second summation point subtracting the derivative from a signal outputted by the weighting section of the I-element.

6 Claims, 3 Drawing Sheets

PID CONTROLLER WITH PROTECTION OF THE INTEGRATOR AGAINST SATURATION UPON A RAPID CHANGE OF THE REFERENCE VARIABLE

FIELD AND BACKGROUND OF THE INVENTION

The invention relates to a PID controller having a parallel arranged P-element, I-element and D-element and in which the output signals from the P-element, I-element and D-element are added, and whose I-element has at least one weighting section and an integrator, in particular a digital controller.

Such a PID controller is known, for example, from the book by Heinz Unbehauen "Klassiche Verfahren zur Analyse und Synthese linear kontinuierlicher Regelsysteme" Classical methods for analysis and synthesis of linear continuous control systems, publisher Vieweg 1982, pages 141 to 142. Figure 5.3.1 on page 142 shows a PID controller which is formed by connecting a P-element, an I-element and a D-element in parallel. The input signal of the PID controller is the control error formed from the reference variable and the actual value of the control variable. In the P-element, all that is done is to weight the control error by a factor $K_P$. The I-element comprises a weighting section, which multiplies the control error by a factor $K_I$, and an integrator, which integrates the weighted control error. The D-element comprises a weighting section which multiplies the control error by a factor $K_D$, and a differentiator which forms the time derivative of the weighted control error. In this PID controller, rapid changes in the reference variable, such as those which occur in the event of a sudden or a ramped change in the reference variable, lead to the integrator being charged up by the large control error. As soon as the actual value of the control variable has reached the reference variable, the integrator must be discharged again, which leads to the mathematical sign of the control error being reversed, that is to say to an overshoot. This is particularly true for control paths having a quasi-integral behavior. Control paths having a quasi-integral behavior are control paths which fundamentally have a PT1 behavior, but in which only the linear initial region is used. The step-function response of such a control path is described in Diagram 6 on page 29 of the book published by Mannesmann Rexroth GmbH, "Der Hydraulik Trainer—Band 6: Hydrostatische Antriebe mit Sekundärregelung" The hydraulic trainer—Volume 6: Hydrostatic drives with secondary control (RD 00 293/08.89). Control paths having a quasi-integral behavior include, for example, rotation-speed control of hydraulic secondary units and pressure regulation using hydraulic displacement pumps. Optimization of the control behavior of such control loops by lengthening the resetting time of the integrator admittedly reduces the tendency to oscillate in response to rapid changes in the reference variable, but causes a deterioration in the disturbance response of the control loop.

SUMMARY OF THE INVENTION

The invention is based on the object of providing a PID controller of the type mentioned initially, in which rapid changes in the reference variable lead only to a minor overshoot in the actual value of the control variable, that is to say of improving the reference behavior without the disturbance response being made worse.

This object is achieved by the invention wherein the time derivative (dy/dt) of the actual value of the control variable is fed to the I-element (e.g., 6 amd 7) with a negative mathematical sign. After a rapid change in the control error, which is caused by a rapid change in the reference variable, the invention reduces the signal fed to the integrator of the PID controller while the control error is subsequently being reduced. The PID controller according to the invention can be produced in a particularly simple form as a digital controller.

BRIEF DESCRIPTION OF THE DRAWINGS

With the above and other objects and advantages in view, the present invention will become more clearly understood in connection with the detailed description of preferred embodiments, when considered with the accompanying drawings of which.

DETAILED DESCRIPTION OF THE PREFERRED EMBODIMENTS

Figure 1:
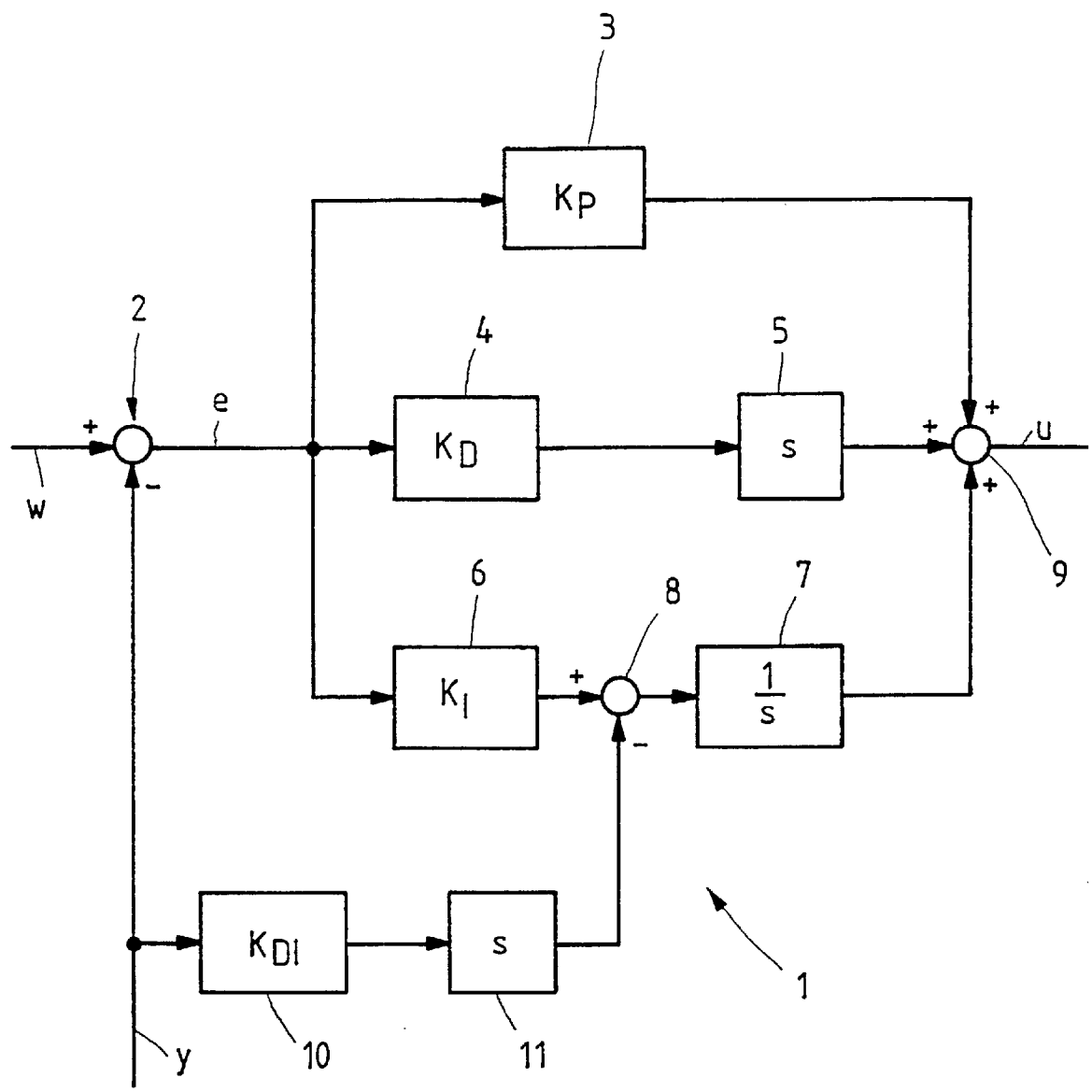
FIG. 1 shows the block diagram of a PID controller according to the invention, in which the control error is fed both to the P-element and to the I-element, as well as to the D-element.
Figure 2:
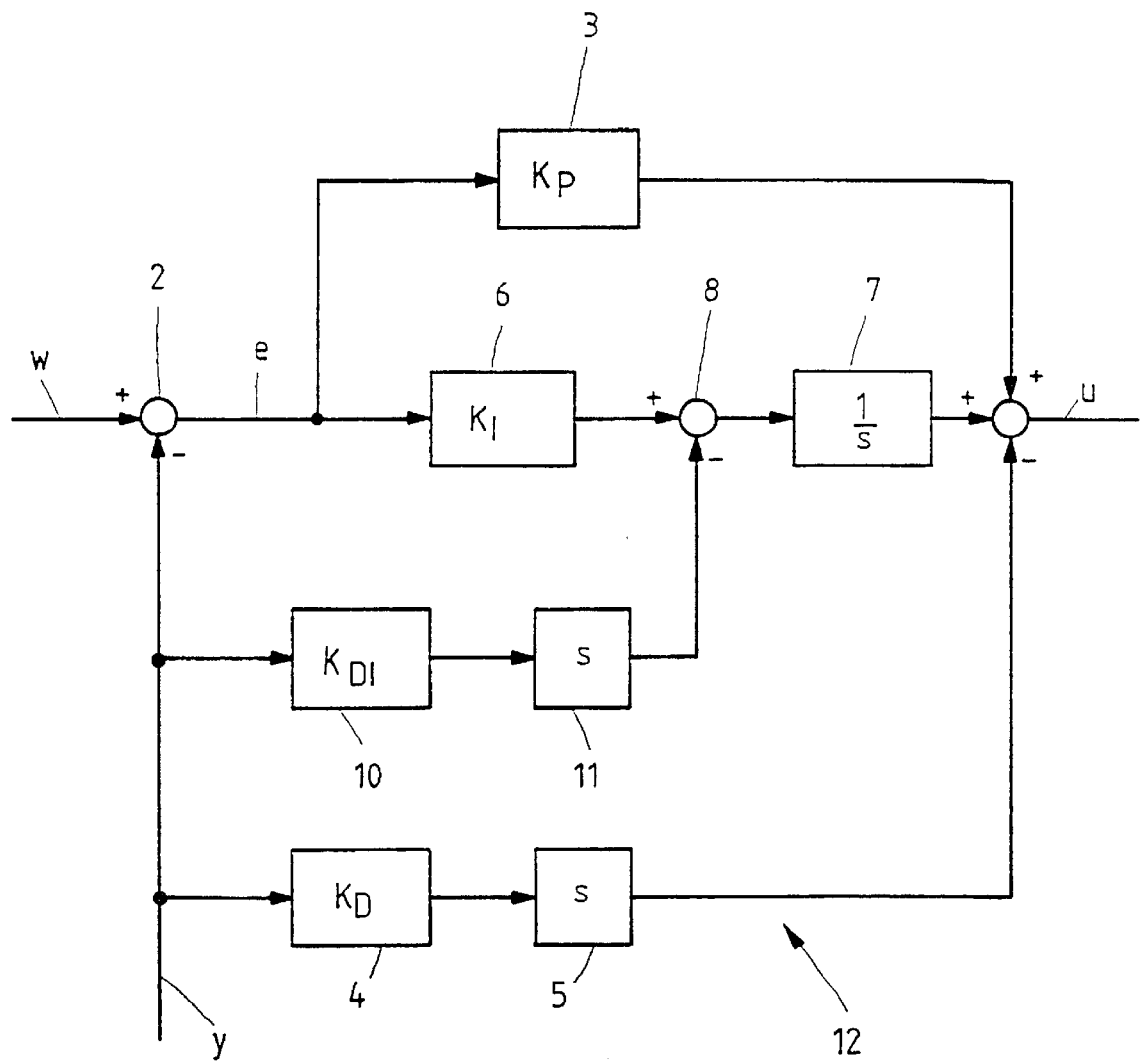
FIG. 2 shows the block diagram of a PID controller according to the invention, in which the control error is fed only to the P-element and to the I-element, and the actual value of the control variable is fed to the D-element.
Figure 3:
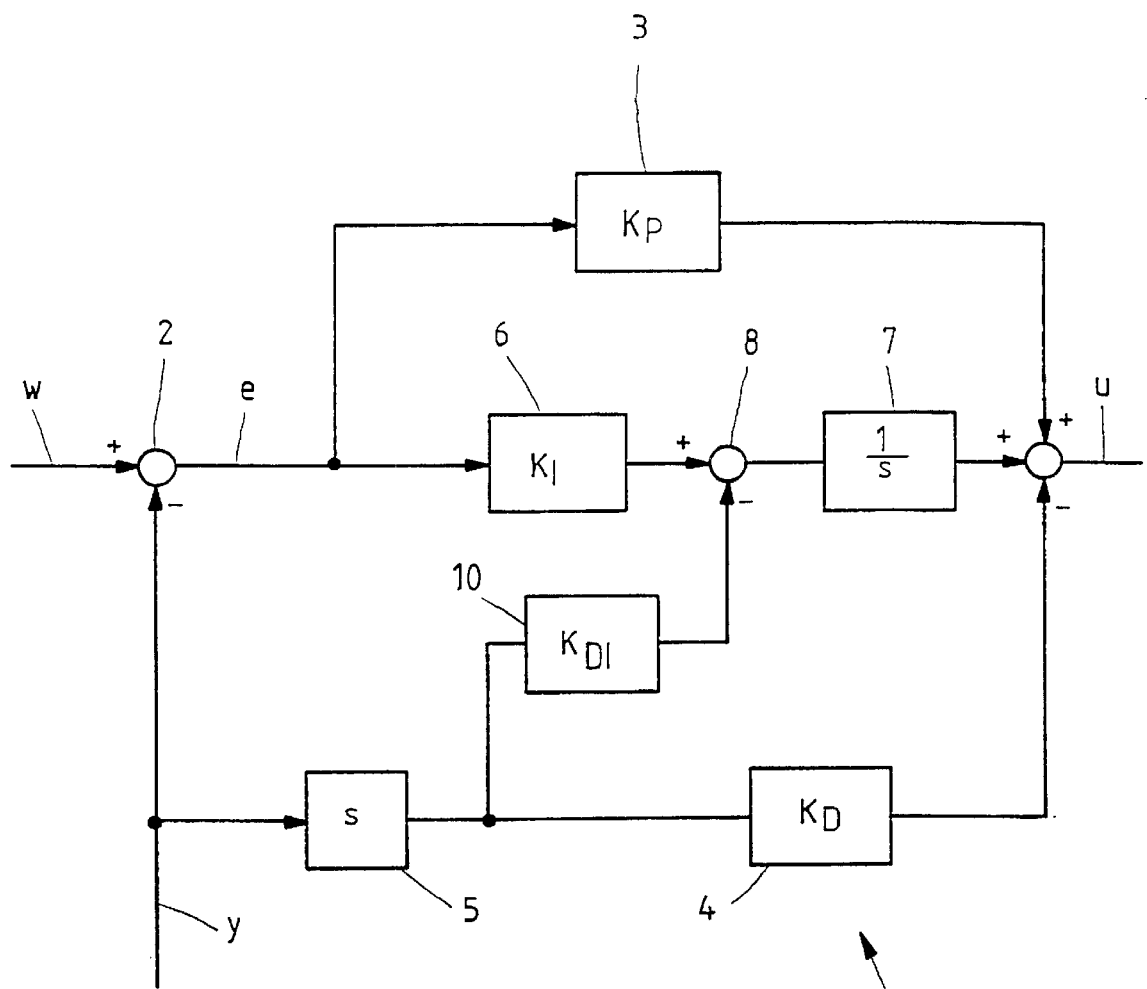
FIG. 3 shows the block diagram of a PID controller corresponding to the block diagram shown in FIG. 2, in which the two differentiators are replaced by one differentiator.

Identical components are provided with the same reference symbols in FIGS. 1 to 3. The reference variable is denoted by w and the actual value of the control variable by y. The control error formed from the difference between the reference variable w and the actual value of the control variable y is denoted by e, and the controller output variable is denoted by u.

FIG. 1 shows the block diagram of a PID controller 1. A summation point 2 forms the control error e from the reference variable w and the actual value of the control variable y. The P-element of the PID controller 1 contains a weighting section 3, which multiplies the control error e by a factor $K_P$. The D-element of the PID controller 1 comprises a weighting section 4, which multiplies the control error e by a factor $K_D$, and a differentiator 5 which forms the time derivative of the output signal from the weighting section 4. The differentiator 5 is symbolized by the Laplace operator s which describes its function. The I-element of the PID controller 1 comprises a weighting section 6 which multiplies the control error e by a factor $K_I$ and an integrator 7 which is symbolized by the reciprocal, which describes its function, of the Laplace operator s. A summation point 8 is arranged between the weighting section 6 and the integrator 7. A summation point 9 links the output signals from the weighting section 3 of the P-element, from the differentiator 5 of the D-element and from the integrator 7 of the I-element to the controller output variable u. The controller output variable u is fed to a control path which is not illustrated in FIG. 1 but has a quasi-integral behavior. Such a PID controller, without the summation point 8, is known per se.

A weighting section 10 and a differentiator 11 are also provided in the exemplary embodiment of the PID controller according to the invention shown in FIG. 1. The actual value of the control variable y is fed to the weighting section 10. The weighting section 10 multiplies the actual value of the control variable y by a factor $K_{DI}$. The differentiator 11 forms the time derivative of the output signal from the weighting section 10. The summation point 8 forms the difference between the output signal from the weighting section 6 and the output signal from the differentiator 11. The output signal from the summation point 8 is fed to the integrator 7 as an input signal.

The input signal of the integrator 7 is dependent not only—as in the case of the known PID controller with a parallel arrangement—on the magnitude of the control error e, but, in addition, also on the rate of change of the actual value of the control variable dy/dt. If the actual value of the control variable y is constant, the output signal from the differentiator 11 is equal to 0, and the PID controller 1 behaves like a known PID controller, in which the weighting section 6 of the I-element is directly connected to the integrator 7, and there is no summation point 8, weighting section 10 or differentiator 11. The additional path comprising the weighting section 10 and the differentiator 11 comes into effect only when the actual value of the control variable y changes. The greater the rate of change of the actual value of the control variable dy/dt, the greater is the output signal from the differentiator 11. The output signal from the summation point 8 is reduced in a corresponding manner. Thus, the greater the rate of change of the actual value of the control variable dy/dt, the less is the influence of the integrator 7 on the controller output variable u. When there is a rapid change in the control error e after a rapid change in the reference variable w, with the control error e subsequently being reduced owing to the response of the actual value of the control variable y (that is to say when the rate of change of the actual value of the control variable dy/dt is not zero) this prevents the integrator 7 from being overcharged. If one considers only the series circuit formed by the blocks 10, 11 and 7, then the effects of the differentiator 11 and of the integrator 7 cancel one another out, so that only the weighting section 10 still has any effect. Theoretically, it would admittedly be possible to save the differentiator 11 and to feed the output from the weighting section 10 with a negative mathematical sign to an additional input of the summation point 9, but in this case the integrator 7 would be charged up too far. In fact, the reduction in the control error e, weighted by the weighting section 6, by the output signal from the differentiator 11 prevents the integrator 7 from being excessively charged, which excessive charge would have to be dissipated again by reversing the mathematical sign of the control error.

The weighting sections 3, 4, 6 and 10 are arranged such that the associated parameters are decoupled from one another. In the event of a change in one of the parameters $K_P$, $K_D$, $K_I$, or $K_{DI}$, the respective other parameters retain their previous value.

FIG. 2 shows the block diagram of another PID controller 12 according to the invention. This PID controller differs from the PID controller 1 shown in FIG. 1 in that the actual value of the control variable y is fed as an input signal to the D-element, which comprises the weighting section 4 and the differentiator 5, instead of the control error e. In this exemplary embodiment, the control error e is also fed as an input signal to the P-element of the PID controller 12, which comprises the weighting section 3, and to the I-element, which comprises the weighting section 6 and the integrator 7. In this exemplary embodiment as well, the output signal from the differentiator 11 reduces the charging of the integrator 7 corresponding to the rate of change of the actual value of the control variable dy/dt. In this exemplary embodiment as well, the weighting sections 3, 4, 6 and 10 are arranged such that the associated parameters are decoupled from one another. In the event of a change in one of the parameters $K_P$, $K_D$, $K_I$, or $K_{DI}$, the respective other parameters retain their previous value.

FIG. 3 shows the block diagram of another PID controller 13 according to the invention. In contrast to the PID controller 12 shown in FIG. 2, the sequence of the weighting section 4 and of the differentiator 5 in the D-element is interchanged, so that the time derivative of the actual value of the control variable dy/dt is formed first, before this signal is weighted. The output signal from the differentiator 5 is fed to the weighting section 10, and the output from the weighting section 10 is connected to the summation point 8. In comparison with the PID controller 12 shown in FIG. 2, the differentiator 11 is missing in the PID controller 13. In this exemplary embodiment as well, the weighting sections 3, 4, 6 and 10 are arranged such that the associated parameters are decoupled from one another. In the event of a change in one of the parameters $K_P$, $K_D$, $K_I$, or $K_{DI}$, the respective other parameters retain their previous value.

We claim:

1. A PID controller having a parallel arranged P-element, I-element and D-element, and in which the P-element, the I-element and the D-element are separately weighted, and in which output signals from the P-element, I-element and D-element are added, and said I-element having at least one weighting section and an integrator located downstream of the weighting section, in particular a digital controller, wherein a time derivative (dy/dt) of an actual value of a control variable is fed to the I-element with a negative mathematical sign and wherein a difference between weighted control error ($K_I \times e$) and weighted derivative ($K_{DI} \times dy/dt$) of an actual value of the control variable is fed to the integrator.

2. The PID controller as claimed in claim 1, wherein the time derivative (dy/dt) of the actual value of the control variable is weighted independently of weighting of a control error (e).

3. The PID controller as claimed in claim 1, wherein the weighting of signals in the P-element and in the D-element is independent of the weighting of the signals fed to the integrator.

4. The PID controller as claimed in claim 1, wherein a control error (e) is fed to the P-element and to the I-element and the actual value of the control variable (y) is fed to the D-element.

5. The PID controller as claimed in claim 4, further comprising a further weighting section, and wherein the time derivative (dvdt) of the actual value of the control variable which is fed to the integrator is formed in the D-element, and wherein the time derivative (dy/dt) of the actual value of the control variable is fed to the integrator via said further weighting section.

6. A PID controller comprising a parallel arrangement of a P-element, an I-element, and a D-element coupled to a first summation point for adding their respective output signals, a summation signal produced by the first summation point being employed for control of a variable, an actual value of the controlled variable being inputted to the parallel arrangement of the P-element, the I-element, and the D-element;

wherein the I-element comprises a series arrangement of a weighting section followed by an integrator, the I-element being coupled to the weighting section by a second summation point; and the controller applies a time derivative of the actual value of the controlled variable to the second summation point, the second summation point subtracting the derivative from a signal outputted by the weighting section of the I-element.

* * * * *